US008582428B1

(12) United States Patent
Bishara et al.

(10) Patent No.: US 8,582,428 B1
(45) Date of Patent: Nov. 12, 2013

(54) METHODS AND APPARATUS FOR FLOW CLASSIFICATION AND FLOW MEASUREMENT

(75) Inventors: Nafea Bishara, San Jose, CA (US); David Melman, Hakerem (IL); Tal Mizrahi, Haifa (IL)

(73) Assignees: Marvell Israel (M.I.S.L) Ltd., Yokneam (IL); Marvell International Ltd., Hamilton (BM)

( * ) Notice: Subject to any disclaimer, the term of this patent is extended or adjusted under 35 U.S.C. 154(b) by 185 days.

(21) Appl. No.: 13/289,819

(22) Filed: Nov. 4, 2011

Related U.S. Application Data

(63) Continuation of application No. 12/259,130, filed on Oct. 27, 2008, now Pat. No. 8,054,744.

(60) Provisional application No. 60/982,560, filed on Oct. 25, 2007, provisional application No. 61/018,760, filed on Jan. 3, 2008.

(51) Int. Cl.
*G01R 31/08* (2006.01)

(52) U.S. Cl.
USPC ........................................................ 370/229

(58) Field of Classification Search
USPC ......... 370/203, 204–215, 229–240, 310–394, 370/395.1, 395.3, 395.4, 395.41, 395.42, 370/395.5, 395.52, 395.53, 412–421, 370/431–529, 521–529, 498–522, 431–457
See application file for complete search history.

(56) References Cited

U.S. PATENT DOCUMENTS

| | | |
|---|---|---|
| 5,559,801 A | 9/1996 | Lo |
| 6,473,400 B1 | 10/2002 | Manning |
| 6,873,600 B1 | 3/2005 | Duffield et al. |
| 6,970,462 B1 | 11/2005 | McRae |
| 7,092,360 B2 | 8/2006 | Saint-Hilaire et al. |
| 7,215,637 B1 | 5/2007 | Ferguson et al. |
| 7,227,842 B1 | 6/2007 | Ji et al. |
| 7,359,968 B1 | 4/2008 | Ng et al. |
| 7,386,699 B1 | 6/2008 | Bishara |
| 7,424,019 B1 | 9/2008 | Kopelman et al. |
| 7,644,157 B2 | 1/2010 | Shomura et al. |
| 7,684,320 B1 | 3/2010 | Nucci |
| 7,688,727 B1 | 3/2010 | Ferguson et al. |
| 2003/0223424 A1 | 12/2003 | Anderson et al. |
| 2004/0148382 A1 | 7/2004 | Narad et al. |
| 2005/0276230 A1 | 12/2005 | Akahane et al. |
| 2006/0048228 A1 | 3/2006 | Takemori et al. |
| 2006/0123467 A1 | 6/2006 | Kumar et al. |

(Continued)

OTHER PUBLICATIONS

Quittek et al., "Requirements for IP Flow Information Export (IPFIX)," RFC 3917, The Internet Society (2004).

(Continued)

*Primary Examiner* — Jung-Jen Liu

(57) ABSTRACT

A packet processing pipeline is configured to classify packets received via a network based on information in the received packets: (1) as belonging to one of a plurality of identified flows, or (2) as not belonging to any of the plurality of identified flows. For each received packet determined not to belong to one of the previously identified flows, the pipeline sends at least a portion of the packet or a corresponding packet descriptor to a processing unit. For each received packet determined not to belong to one of the previously identified flows, the processing unit defines a new flow corresponding to the packet based on an analysis of the portion corresponding packet descriptor, and configures the packet processing pipeline to handle the new flow.

21 Claims, 7 Drawing Sheets

(56) References Cited

U.S. PATENT DOCUMENTS

| | | |
|---|---|---|
| 2007/0061433 A1 | 3/2007 | Reynolds et al. |
| 2007/0070907 A1 | 3/2007 | Kumar et al. |
| 2007/0076606 A1 | 4/2007 | Olesinski et al. |
| 2007/0201379 A1 | 8/2007 | Kondapalli |
| 2007/0223388 A1 | 9/2007 | Arad et al. |
| 2007/0268922 A1 | 11/2007 | Dougan et al. |
| 2008/0212586 A1 | 9/2008 | Wang et al. |
| 2008/0225853 A1 | 9/2008 | Melman et al. |
| 2008/0240113 A1 | 10/2008 | Arad et al. |

OTHER PUBLICATIONS

Cisco Systems NetFlow Services Export V9, RFC 3954, Oct. 2004.

METHODS AND APPARATUS FOR FLOW CLASSIFICATION AND FLOW MEASUREMENT

CROSS-REFERENCE TO RELATED APPLICATION

The present application is a continuation application of U.S. application Ser. No. 12/259,130, now U.S. Pat. No. 8,054,744, entitled "METHOD AND APPARATUS FOR FLOW MEASUREMENT," filed on Oct. 27, 2008, which claims the benefit of U.S. Provisional Application No. 60/982,560, entitled "IPFix," which was filed on Oct. 25, 2007. U.S. application Ser. No. 12/259,130, now U.S. Pat. No. 8,054,744, also claims the benefit of U.S. Provisional Patent Application No. 61/018,760, entitled "IPFix," which was filed on Jan. 3, 2008. The entire disclosures of all of the above-referenced applications are hereby incorporated by reference herein.

FIELD OF TECHNOLOGY

The present disclosure relates generally to communication networks and, more particularly, to flow classification and generating flow traffic measurements.

BACKGROUND

It is often useful to obtain traffic flow measurements in a network that utilizes a protocol such as the Internet Protocol (IP). For example, such measurements may be used to characterize flows using parameters such as flow duration, volume, time, burstiness, etc. Flow traffic information may be useful for network planning, optimizing network resource utilization or traffic performance, detection of and defense against network attack/intrusion, quality of service (QoS) monitoring, usage-based accounting, etc.

Traffic flow measurements may be made by a network bridge, switch or router, for example, or some other measurement device. Then, these measurements may be utilized by various applications such as a traffic profiling application, a traffic engineering application, an attack/intrusion detection system, an accounting application, a QoS validation application, etc. For example, a traffic profiling application may utilize flow measurements taken at multiple different nodes (e.g., routers, bridges, switches, etc.) in a network so as to analyze traffic in different portions of the network. Various definitions and requirements for export of IP flow information and for metering processes have been proposed by the Network Working Group of the Internet Society at least in the Request for Comments 3917, "Requirements for IP Flow Information Export (IPFIX)", 2004 (RFC 3917).

SUMMARY

In one embodiment, a method for analyzing packets received from a network includes receiving packets from a network at a packet processing pipeline, and classifying, using the packet processing pipeline, the received packets based on information in the received packets: (1) as belonging to one of a plurality of identified flows, or (2) as not belonging to any of the plurality of identified flows. The method also includes, for each received packet determined not to belong to one of the previously identified flows, sending at least a portion of the packet or a corresponding packet descriptor to a processing unit separate from the packet forwarding pipeline, wherein the processing unit operates at a speed slower than an operating speed of the packet processing pipeline, analyzing the at least the portion of the packet or the corresponding packet descriptor using the processing unit, defining a new flow corresponding to the packet using the processing unit and based on the analysis of the at least the portion of the packet or the corresponding packet descriptor, configuring, using the processing unit, the packet processing pipeline so that the packet processing pipeline recognizes the new flow as a one of the plurality of identified flows, and configuring, using the processing unit, the packet processing pipeline with one or more new rules corresponding to the new flow so that packets belonging to the new flow are processed by the packet processing pipeline according to the one or more new rules.

In another embodiment, an apparatus comprises a processing unit, and a packet processing pipeline separate from and coupled to the processing unit, wherein the packet processing pipeline operates at a speed faster than an operating speed of the processing unit. The packet processing pipeline is configured to classify packets received via a network based on information in the received packets: (1) as belonging to one of a plurality of identified flows, or (2) as not belonging to any of the plurality of identified flows, and for each received packet determined not to belong to one of the previously identified flows, send at least a portion of the packet or a corresponding packet descriptor to the processing unit. The processing unit is configured to, for each received packet determined not to belong to one of the previously identified flows, analyze the at least the portion of the packet or the corresponding packet descriptor, define a new flow corresponding to the packet based on the analysis of the at least the portion of the packet or the corresponding packet descriptor, configure the packet processing pipeline so that the packet processing pipeline recognizes the new flow as a one of the plurality of identified flows, and configure the packet processing pipeline with one or more new rules corresponding to the new flow so that packets belonging to the new flow are processed by the packet processing pipeline according to the one or more new rules.

DETAILED DESCRIPTION

Figure 1:
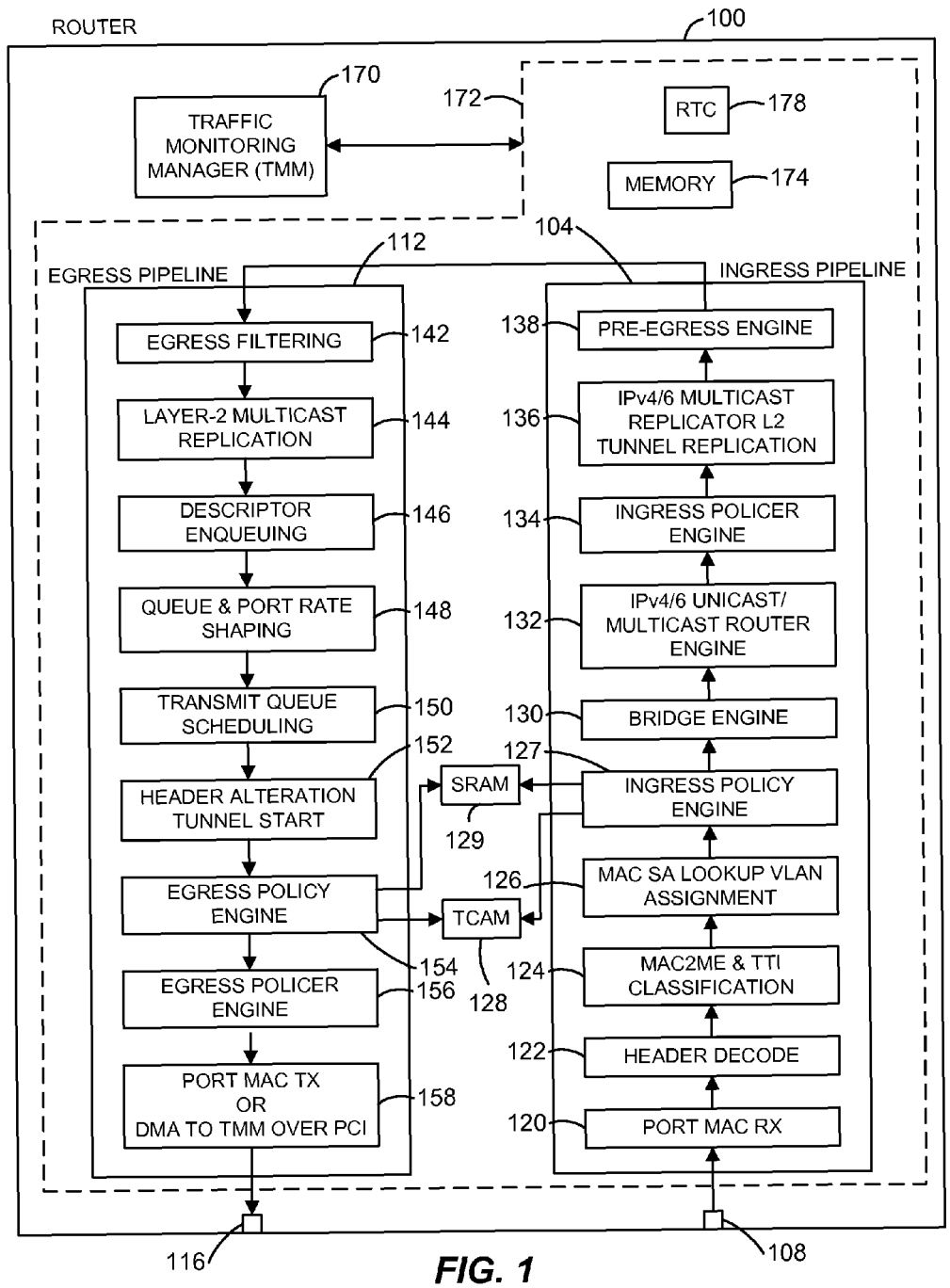
FIG. 1 is a block diagram of an example router that includes capabilities for traffic flow measurement.

FIG. 1 is a block diagram of an example router 100 that includes capabilities for traffic flow measurement. The router 100 includes an ingress pipeline 104 coupled to one or more input circuits 108, and an egress pipeline 112 coupled to one or more output circuits 116. Additionally, the ingress pipeline 104 and the egress pipeline 112 are coupled together. The inputs circuits 108 and the output circuits 116 may be coupled to one or more networks such as a wide area network (WAN), a local area network (LAN), such a wired LAN or a wireless LAN (WLAN), etc. The one or more input circuits 108 are for receiving a plurality of flows, each flow comprising a plurality of packets. Similarly, the one or more output circuits are for transmitting the plurality of flows. The ingress pipeline 104 and the egress pipeline 112 generally transfer packets of data from the input circuits 108 to appropriate ones of the output circuits 116. The one or more input circuits 108 may correspond to one or more input ports of the router 100, and the one or more output circuits 116 may correspond to one or more output ports of the router 100.

As shown in FIG. 1, the ingress pipeline 104 and the egress pipeline 112 each include a plurality of units coupled in series. Generally, each unit of a pipeline optionally processes a packet or a packet descriptor corresponding to the packet and then passes the packet or the packet descriptor to the next unit in the pipeline. A packet descriptor may include some information from the packet, such as some or all of the header information of the packet. The packet descriptor may include other information as well such as an indicator of where the packet is stored in a memory associated with the router 100. For ease of explanation, the term "packet" hereinafter may be used to refer to a packet itself or to a packet descriptor associated with the packet. Each unit may or may not process a particular packet. For example, in some instances, a unit may simply forward a packet onto the next unit in the pipeline. The last unit of the ingress pipeline 104 passes the packet to the first unit of the egress pipeline 112.

Each or at least some of the units of the ingress pipeline 104 and the egress pipeline 112 may include, or otherwise be associated with, a corresponding memory. A packet received by a unit may be stored in the memory associated with the unit.

The ingress pipeline 104 includes a port media access control (MAC) receiver unit 120 coupled to the input circuits 108. The port MAC receiver unit 120 generally implements media access control functions. A header decode unit 122 is coupled to the port MAC receiver unit 120 and generally decodes the header of each packet received via the input circuits 108. This may include parsing or identifying different segments of the header for use by subsequent units in the ingress pipeline 104 and, optionally, units in the egress pipeline 112.

A MAC2ME & TTI classification unit 124 is coupled to the header decode unit 122. The MAC2ME & TTI classification unit 124 generally performs two lookup functions. In a first lookup function (a MAC2ME lookup), packets that are destined to a MAC address, VLAN pair associated with the router 100 may be identified. This identification may be used in one or more subsequent functions or pipeline units. A second lookup function (a tunnel termination interface (TTI) lookup) may be used for tunnel termination identification and/or classifying a logical interface according to L2 or L3 header fields. In an embodiment, the MAC2ME & TTI classification unit 124 may include, or be coupled to, a ternary content addressable memory (TCAM) or other suitable memory. In this embodiment, the TTI lookup may include using fields of the header of the packet being processed and other information (such as the result of the MAC2ME lookup) as a key to the TCAM. Optionally, the TTI lookup may utilize one or more additional memory components such as a static random access memory (SRAM). For example, an entry in the TCAM may point to a particular location in an SRAM, and the TTI lookup may include retrieving information from the SRAM. The TTI lookup may indicate that the packet should be associated with one or more TTI actions, such as assigning a VLAN identifier, quality of service (QoS) parameters, etc., to the packet. A MAC source address (SA) lookup virtual LAN (VLAN) assignment unit 126 is coupled to the MAC2ME and TTI classification unit 124. The MAC SA lookup VLAN assignment unit 126 generally uses the MAC source address in a packet header, and possibly other information, to determine to which VLAN, if any, a particular packet belongs.

An ingress policy engine 127 is coupled to the MAC SA lookup VLAN assignment unit 126. The ingress policy engine 127 may be considered an observation point as defined in RFC 3917. The ingress policy engine 127 generally determines whether an ingressing packet belongs to an existing flow (i.e., a flow of which the router 100 is already aware and/or a flow that the router 100 previously identified) or belongs to a currently unknown flow (sometimes referred to in the present disclosure as a "new flow"). If the ingressing packet belongs to an existing flow, the ingress policy engine 127 will determine the existing flow to which the packet belongs. Additionally, the ingress policy engine 127 detects whether an ingressing packet belongs to a new flow. The ingress policy engine 127 may attach a flow identifier to the ingressing packet. If an ingressing packet is part of an existing flow, the flow identifier may indicate the flow to which the ingressing packet belongs. If the ingressing packet is not part of an existing flow, the flow identifier may indicate that the ingressing packet belongs to a new flow.

In an embodiment, the ingress policy engine 127 may include, or be coupled to, a ternary content addressable memory (TCAM) 128 or other suitable memory. The ingress policy engine 127 generally uses fields of the header of the packet being processed as a key to the TCAM 128. An entry in the TCAM 128 may correspond to an existing flow and may indicate a particular rule or set of one or more actions to be performed (with regard to flow measurement, for example). Also, an entry in the TCAM 128 may correspond to detection of a new flow and may indicate a particular rule or set of one or more actions to be performed when a new flow is detected. Optionally, the ingress policy engine 127 may also include, or be coupled to, one or more other memories, such as a static random access memory (SRAM) 129 or other suitable memory. In this embodiment, an entry in the TCAM 128 may indirectly indicate a rule or set of one or more actions to be performed, and determining a rule or action to be performed may utilize the one or more additional memory components such as the SRAM 129. For example, an entry in the TCAM 128 may point or otherwise correspond to a particular location in the SRAM 129 that includes information that in turn indicates a particular rule or set of one or more actions to be performed. The ingress policy engine 127 optionally may utilize the result of the MAC2ME lookup of the MAC2ME and TTI classification unit 124. For example, the result of the MAC2ME lookup could be used as part of the key to the TCAM 128.

In other embodiments, flow identification need not utilize a TCAM. For example, a hashing technique or any other technique for classifying multi-field parameters may be utilized. Thus, in some embodiments, the TCAM 128 may be omitted.

A bridge engine 130 is coupled to the ingress policy engine 127. The bridge engine 130 includes, or is coupled to, a forwarding database (not shown) that includes MAC destination addresses and indications of their corresponding network segments. The bridge engine 130 generally handles the forwarding of packets destined for a segment of a network to which the router 100 is connected. The bridge engine determines whether a received packet should be forwarded to a different network segment and, if so, to which network segment the packet should be forwarded. Determination of whether, and to where a packet should be forwarded, may be done by examining the MAC destination address of the packet and determining to which network segment the destination address corresponds using the forwarding database. Also, other information may be utilized as well, such as VLAN information. The bridge engine 130 also may maintain the forwarding database.

A router engine 132 is coupled to the bridge engine 130. If a received packet is not destined for a network to which the router 100 is connected, then routing based on an Internet Protocol (IP) address may be performed. The router engine 132 includes, or is coupled to, a routing information database (not shown) that includes information corresponding to where IP packets should be forwarded. The router engine 132 generally determines to where a received IP packet should be routed. This may be done by examining the IP destination address of the packet and routing information stored in the routing information database. The router engine 132 also maintains the routing information database. In an embodiment, the router engine 132 may be compliant with IP version 4 (v4) and IP version 6 (v6). Of course, in other embodiments, the router engine 132 additionally or alternatively may be compliant with one or more other IP versions including previous IP versions and IP versions not yet standardized. Additionally, the router engine 132 may be capable of determining destinations for multicast packets.

An ingress policer engine 134 may be coupled to the router engine 132. The ingress policer engine 134 may be considered an observation point as defined in RFC 3917. The ingress policer engine 134 generally performs rate limiting and makes flow traffic measurements and stores flow measurement information in flow entries. The ingress policer engine 134 may include a plurality of counters for making flow traffic measurements. The ingress policer engine 134 also may sample packets. Additionally, the ingress policer engine 134 also may apply time stamps to packets or to descriptors associated with the packets. The ingress policer engine 134 may take different actions for different flows. Thus, the ingress policer engine 134 may utilize flow classification information (e.g., a flow identifier for a packet) from the ingress policy engine 127 in determining what actions should be taken.

A multicast replicator 136 may be coupled to the ingress policer engine 134. The multicast replicator 136 generally replicates multicast packets, if necessary, for forwarding via multiple output circuits 116. The multicast replicator 136 may be compliant with IP v4 and IP v6, for example. Additionally, the multicast replicator 136 may support a multicast extension to the Layer Two Tunneling Protocol (LTTP).

A pre-egress engine 138 may be coupled to the multicast replicator 136. The pre-egress engine 138 generally analyzes decisions made by previous units in the ingress pipeline 104 and drops, forwards or duplicates the packet or packet descriptor to the egress pipeline 112 based on the analysis. If the packet destination is a trunk, the pre-egress engine 138 may select the trunk member to which the packet is transmitted, based on a configurable has function for example.

The egress pipeline 112 may be coupled to the pre-egress engine 138. In particular, an egress filtering unit 142 may be coupled to the pre-egress engine 138. A Layer-2 multicast replication unit 144 is coupled to the egress filtering unit 142. A descriptor enqueuing unit 146 is coupled to the Layer-2 multicast replication unit 144. The descriptor enqueuing unit 146 generally enqueues packet descriptors in a plurality of queues corresponding to different classes of flows, for example.

A queue and port rate shaping unit 148 is coupled to the descriptor enqueuing unit 146. A transmit queue scheduling unit 150 is coupled to the queue and port rate shaping unit 148. The transmit queue scheduling unit 150 generally enqueues packet descriptors from the queues associated with the descriptor enqueuing unit 146 into one or more transmit queues corresponding to the one or more output circuits 116. A header alteration, tunnel start unit 152 is coupled to the transmit queue scheduling unit 150. The header alteration, tunnel start unit 152 generally alters the header of a packet as needed. For example, a source address, a destination address, etc. may be altered for a next hop, a tunnel header may be prepended if the packet is to be forwarded to a tunnel start interface, etc.

An egress policy engine 154 is coupled to the header alteration, tunnel start unit 152. The egress policy engine 154 may be considered an observation point as defined in RFC 3917. The egress policy engine 154 generally determines whether an egressing packet belongs to an existing flow (i.e., a flow of which the router 100 is already aware) or belongs to a currently unknown flow (sometimes referred to in the present disclosure as a "new flow"). If the egressing packet belongs to an existing flow, the egress policy engine 154 will determine the existing flow to which the egressing packet belongs. Additionally, the egress policy engine 154 detects whether an egressing packet belongs to a new flow. The egress policy engine 154 may attach a flow identifier to the egressing packet. If an egressing packet is part of an existing flow, the flow identifier may indicate the flow to which the egressing packet belongs. If the egressing packet is not part of an existing flow, the flow identifier may indicate that the egressing packet belongs to a new flow.

The egress policy engine 154 may be coupled to the TCAM 128 (or other suitable memory). Similar to the ingress policy engine 127, the egress policy engine 154 generally uses fields of the header of the packet being processed as a key to the TCAM 128. An entry in the TCAM 128 may correspond to a corresponding existing flow and may indicate a particular rule or set of one or more actions to be performed (with regard to flow measurement). Also, an entry in the TCAM 128 may correspond to detection of a new flow. Optionally, an entry in the TCAM 128 may indirectly indicate a rule or set of one or more actions to be performed, and determining a rule or action to be performed may utilize one or more additional memory components such as the SRAM 129 or other suitable memory. For example, an entry in the TCAM 128 may point or otherwise correspond to a particular location in the SRAM 129 that includes information that in turn indicates a particular rule or set of one or more actions to be performed. Optionally, the egress policy engine 154 may include, or be coupled to, a TCAM (or other suitable memory) separate from the TCAM 128 (or other suitable memory). Similarly, the egress policy engine 154 may include, or be coupled to, one or more other memory devices separate from the SRAM 129. In other embodiments, flow identification need not utilize a TCAM. For example, a hashing technique or any other technique for classifying multi-field parameters may be utilized. Thus, in some embodiments, the TCAM 128 may be omitted.

An egress policer engine 156 may be coupled to the egress policy engine 154. The egress policer engine 156 may be considered an observation point as defined in RFC 3917. The egress policer engine 156 generally performs rate limiting and makes flow traffic measurements and stores flow measurement information in flow entries. The egress policer engine 156 may include a plurality of counters for making flow traffic measurements. The egress policer engine 156 also may sample packets. Additionally, the egress policer engine 156 also may apply time stamps to packets or to descriptors associated with the packets. The ingress policer engine 134 may take different actions for different flows. Thus, the egress policer engine 156 may utilize flow classification information (e.g., a flow identifier for a packet) from the ingress policy engine 127 or the egress policy engine 154 in determining what actions should be taken.

A port MAC transmit or direct memory access (DMA) to traffic monitoring manager (TMM) unit 158 is coupled to the egress policer engine 156. The port MAC transmit/DMA to TMM unit 158 generally implements media access control functions and forwards packets to the output circuits 116. The port MAC transmit/DMA to TMM unit 158 also may forward or mirror packets to a TMM, as will be discussed below.

As seen in FIG. 1, the router 100 also includes a traffic monitoring manager (TMM) 170 coupled to the ingress pipeline 104 and the egress pipeline 112. The TMM 170 generally creates flow entries for new flows when the new flows are detected by the ingress policy engine 127 and the egress policy engine 154. The TMM 170 also generally configures the ingress policy engine 127 and the egress policy engine 154 to detect packets corresponding to the new flows. Additionally, the TMM 170 may also determine when a flow has expired, for example by examining a time stamp of a last sampled packet or packet header and comparing the time stamp to a current time.

The TMM 170 may be implemented by a central processing unit (CPU) configured according to computer readable instructions stored on a memory coupled to the CPU. On the other hand, the ingress pipeline 104, the egress pipeline 112, and other units of the router 100 that will be described below may be implemented on a single application specific integrated circuit (ASIC) 172 coupled to the CPU. In other embodiments, other types of integrated circuits may be used such as a field programmable gate array (FPGA), a programmable logic array (PLA), a custom integrated circuit, etc. In other embodiments, the ingress pipeline 104 and the egress pipeline 112 or various modules in the pipelines 104, 112 may be implemented on multiple different integrated circuits that are coupled together.

The router 100 also may include a memory 174 for storing flow entries. The memory 174 may be coupled to the ingress pipeline 104, the egress pipeline 112, and the TMM 170. The memory 174 may be included on the ASIC 172. In other implementations, however, the memory 174 may be on an IC separate from the ASIC 172.

The router 100 also may include a real time clock (RTC) 178 coupled to the ingress pipeline 104 and the egress pipeline 112. The RTC 178 may be utilized for creating time stamps. The RTC 178 may be included on the ASIC 172. In other implementations, however, the RTC 178 may be on an IC separate from the ASIC 172.

Generally, the ASIC 172 operates at wire speed whereas the TMM 170 may operate at a much slower speed. For example, traffic flow measurements for existing flows may be made and stored in flow entries at wire speed. On the other hand, when a new flow is detected by the ingress pipeline 104 or the egress pipeline 112, the TMM 170, operating at a speed slower than wire speed, may create flow entries for the new flows and configure the ingress pipeline 104 and the egress pipeline 112 to detect packets associated with the new flows and to make flow measurements for the new flows. Thus, the router 100 implements dynamic flow classification, i.e., flow classification into already known flows and new flow detection are performed at wire speed, and when new flows are detected, the router 100 dynamically reconfigures itself (not necessarily at wire speed) to perform flow classification with regard to subsequently detected new flows which may then be performed at wire speed.

Existing flow detection by the ingress pipeline 104 or the egress pipeline 112 may be based on any of the following information included in a packet header: protocol type, IP version, virtual LAN (VLAN) or the port associated with a port-based VLAN, source IP address, destination IP address, differentiated services code point (DSCP), layer-four (L4) ports (e.g., source or destination ports for transmission control protocol (TCP), user datagram protocol (UDP) or stream control transmission protocol (SCTP)), MPLS labels, the experimental (EXP) field of an MPLS header, virtual routing and forwarding identifier (VRF ID) multiplexed with user database (UDB) fields, router ports, etc.

The router 100 may be configured for flow monitoring on each router ingress port and egress port. The TMM 170 handles flow expiration. For example, the TMM 170 can identify an idle flow based on the last packet timestamp associated with a flow. If the last packet timestamp is older than a timeout parameter, the TMM 170 may determine that the flow is idle and then remove the corresponding entry from the TCAM 128. Additionally, the ingress pipeline 104 and/or the egress pipeline 112 can help expedite identifying the ending of flows. For example, the ingress pipeline 104 and/or the egress pipeline 112 can monitor the finish (FIN) flag and the reset (RST) flag in TCP packets to identify TCP connections that are terminating. When a terminating TCP connection associated with a flow is terminating, the ingress pipeline 104 and/or the egress pipeline 112 can send a signal to the TMM 170. In response, the TMM 170 may determine that the flow is idle and then remove the corresponding entry from the TCAM 128. Because space in the TCAM 128 is finite, the removal of entries corresponding to expired flows enables subsequent storage of entries corresponding to new flows, and thus subsequent classification of these new flows at wire speed using TCAM-based classification.

Although flow classification and flow measurement techniques were described above with reference to the router 100, these techniques may be utilized in other types of packet forwarding devices such as routers different than the router 100, network bridges, etc.

Figure 2:
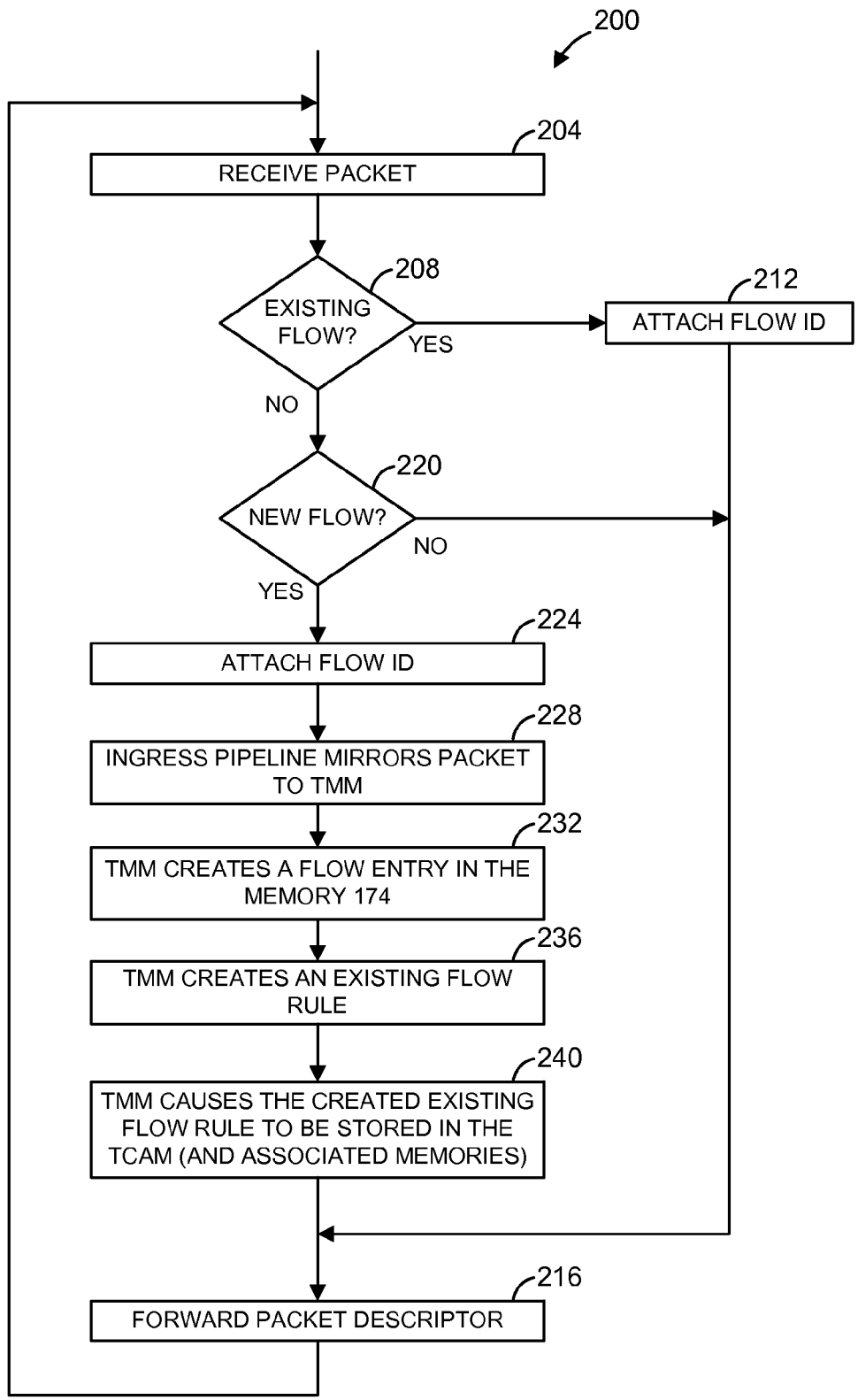
FIG. 2 is a flow diagram of an example method for flow classification that may be implemented by the router of FIG. 1.

Operation of the example router 100 will now be described with reference to several further figures. For instance, FIG. 2 is a flow diagram of an example method 200 for flow classification. The example method 200 is also for detecting new flows and dynamically configuring the router 100 for performing flow classification and making flow measurements for the new flows. Although the example method 200 may be implemented by the router 100 of FIG. 1, it will be understood that the example method 200 may be implemented by a packet forwarding device different than the example router 100, and that the router 100 need not implement the method 200. For example, the method 200 may be implemented in a router different than the router 100, a network bridge, etc.

At block 204, a packet may be received from the previous unit in the ingress pipeline 104. For example, the ingress policy engine 127 may receive a packet and store the packet in the memory associated with the ingress policy engine 127. At a block 208, it may be determined if the received packet is part of an existing flow. For example, as discussed above the ingress policy engine 127 includes, or is coupled to, the TCAM 128, which has entries corresponding to existing flows and to the detection of new flows. The ingress policy engine 127 generally uses fields of a header of the packet as a key to the TCAM 128. As just one example, a protocol type field, a source IP address field, and a destination IP address field may be utilized. If there is a match in the TCAM 128 to an entry corresponding to an existing flow, then the packet may be considered to be part of the corresponding flow.

The TCAM 128 generally may be described as implementing existing flow rules and new flow rules. For example, an existing flow rule may define how packets in an existing rule are to be detected based on header information (e.g., protocol type field, source IP address field, and destination IP address field). Similarly, a new flow rule may define how packets from a flow that does not correspond to an existing flow are to be detected based on header information.

For each existing flow entry in the TCAM 128, the TCAM 128 may include an indication of one or more actions to be performed when a packet from that flow is detected. Information specifying the one or more actions to be taken may be stored in the TCAM 128 itself, or the TCAM 128 may merely store an indicator of the one or more actions to be taken, and the indicator may be utilized to determine the one or more actions utilizing one or more other memories associated with the TCAM 128, such as the SRAM 129. For example, an entry in the TCAM 128 may be a pointer that points to a location in the memory 129 at which information specifying the one or more actions to be taken is stored. Similarly, an entry in the TCAM 128 may be a flow ID, and the flow ID may be utilized to determine a location in the memory 129 at which information specifying the one or more actions to be taken is stored.

An example of an action to be taken when it is determined that the packet belongs to an existing flow is associating a flow identifier (ID) with the packet. Thus, if at block 208 it is determined that the received packet is part of an existing flow, then, at block 212, a flow ID may be attached to the packet. For example, the flow ID may be appended to the packet. The flow ID is an indicator of the flow to which the packet belongs. Other examples of actions to be taken when it is determined that the packet belongs to an existing flow is forwarding the packet to the next unit in the pipeline.

At block 216, the packet may be forwarded to the next unit in the ingress pipeline 104. The block 216 may or may not correspond to an action specified or indicated by the entry in the TCAM 128. For example, the block 216 may be a "hard-wired" action to be taken when a new flow is detected, as opposed to an action specified or indicated by the. Then, the flow may return to block 204, at which a next packet is received.

If it is determined at the block 208 that the packet does not belong to an existing flow, the method may proceed to block 220. For example, it may be determined that the packet does not belong to an existing flow if the packet header information used as a key to the TCAM 128 does not match any existing flow entries in the TCAM 128. The entries of the TCAM 128 may be ordered or prioritized such that only if there is no match on any of the existing flow entries will detection of new flow entries be considered. For example, if protocol type field, source IP address field, and destination IP address field are utilized as the key to the TCAM 128, a new flow detection rule may include all IP packets that don't correspond to an existing flow and that indicate a particular router ingress port and a particular router egress port.

At block 220, it may be determined if a new flow rule is satisfied. For example, if there is a match in the TCAM 128 indicating that the packet corresponds to a new flow, then it is determined that a new flow rule is satisfied. On the other hand, if none of one or more new flow rules is satisfied, the flow of the method 200 may proceed to block 216. Alternatively, if none of one or more new flow rules is satisfied, the packet may be trapped to the TMM 170, and the flow of the method 200 may proceed to block 216 (or optionally back to block 204).

If at block 220 it is determined that a new flow rule is satisfied, corresponding action or actions may be implemented. For example, the entry in the TCAM 128 may specify, point to, or otherwise indicate an action or actions to be implemented. For example, the TCAM entry may include a pointer to a location in the SRAM 129, or may include an ID that can be utilized to determine the location in the SRAM 129, and the location in the SRAM may indicate the one or more actions that should be taken. The specified action or actions may include attaching a flow ID to the packet indicating the packet belongs to a new flow, mirroring the packet to the TMM 170, and/or forwarding the packet to the next unit in the pipeline, for example.

Thus, if at block 220 it is determined that the received packet is part of a new flow, then, at block 224, a flow ID may be attached to the packet. The flow ID is an indicator that the packet belongs to a new flow. Optionally, block 220 may be omitted. For example, if at block 208 it is determined that the packet does not belong to an existing flow, it may be assumed that the packet belongs to a new flow. Thus, the "NO" branch of block 208 may flow to the block 224.

At block 228, the ingress policy engine 127 may mirror the packet to the TMM 170. Additionally, the ingress policy engine 127 may indicate to the TMM 170 that the packet corresponds to a new flow. For example, if a flow ID is attached to the packet, the flow ID may indicate that the packet corresponds to a new flow. Each of the blocks 224 or 228 may or may not correspond to an action specified, pointed to, or otherwise indicated by the entry in the TCAM 128. For example, each of the blocks 224 and 228 may be a "hard-wired" action to be taken when a new flow is detected, as opposed to an action specified, pointed to, or otherwise indicated by the entry in the TCAM 128.

At block 232, in response to receiving the packet corresponding to the new flow, the TMM 170 may create a new flow entry corresponding to the new flow. Creating the new flow entry may include creating an existing flow ID that is unique as compared to the flow IDs of the other existing flows.

At block 236, the TMM 170 may create an existing flow rule for the detected new flow. Creating the existing flow rule may include creating a rule for detecting packets from the flow and specifying set of one or more actions to be taken when a packet from the flow is detected. The rule for detecting packets from the flow may include a TCAM match rule such as all IP packets having a particular source IP address and a particular destination IP address. Regarding specifying the action to be taken, a TCAM entry corresponding to the new flow may be created, the TCAM entry for storage in the TCAM 128. The TCAM entry created by the TMM 170 may specify or indicate a set of one or more actions to be taken when packets from the flow are detected. For example, the TCAM entry may be a flow ID or a pointer that may be utilized to obtain information in another memory such as the SRAM 129. Examples of actions in the set of one or more actions to be taken may include forwarding the packet to the next unit in the pipeline (the action entry may also specify whether forwarding may be done with or without mirroring to the TMM 170), trapping the packet to the TMM 170, monitoring a counter pointer, etc.

At block 240, the TMM 170 may store the created existing flow rule in the TCAM 128 or cause the created existing flow rule to be stored in the TCAM 128 and, optionally, in one or more memories associated with the TCAM 128 such as the SRAM 129. Storing the rule in the TCAM 128 and the associated one or more other memories may include storing the TCAM entry created at block 236 in the TCAM 128 such that the entry corresponds to a match of a specified matching rule (e.g., an IP packet having the particular source IP address and the particular destination IP address). As discussed above, the TCAM entry may point to or otherwise indicate a location in some other associated memory or memories, such as the SRAM 129. Thus, the block 240 may include storing an indication of a set of one or more actions to be taken in some other memory such as the SRAM 129. The block 240 optionally may include purging, if the TCAM 128 is full, one or more currently existing rules to make room in the TCAM 128. In this implementation, only the most current and/or relevant rules are maintained. Then, the flow of the method 200 may proceed to block 216.

Because the TMM 170 generally operates at a slower speed as compared to the ingress pipeline 104, it is possible, but unlikely, that a plurality of packets corresponding to a new flow may be mirrored to the TMM 170 before the TMM 170 is able to update the TCAM 128. If this does occur, then packets received prior to updating the TCAM 128 will not be part of the flow measurements for the new flow.

In accordance with an embodiment, the ASIC 172 only sends traffic to the TMM 170 that should be processed by the TMM 170. Traffic that is unnecessarily sent to the TMM 170 may burden the TMM 170 and delay handling of traffic that the TMM 170 should process. Additionally, traffic sent to the TMM 170 may be rate-limited based on protocol type and prioritized into separate queues, for example. This will help the TMM 170 to process high priority traffic with less delay even when overloaded with low priority traffic, and may help with Denial-of-Service attacks, for example.

In some instances, a packet may belong to multiple flows. Thus, the ingress policy engine 127 optionally may be configured to determine that a packet belongs to multiple flows when appropriate. For example, the ingress policy engine 127 may be configured to check for multiple matches in the TCAM 128. Also, in the example method 200, block 208 may include determining if the packet belongs to multiple flows, and block 212 may include attaching multiple flow IDs when it is determined that a packet belongs to multiple flows. Similarly, when a new flow is detected, the TMM 170 may determine that the packet belongs to multiple flows, and thus may create multiple flow entries, rules, sets of actions, etc., corresponding to the multiple flows.

Although the example method 200 was explained with reference to the ingress policy engine 127 and the ingress pipeline 104, a method similar to the method 200 may also be implemented by the egress policy engine 154 and/or the egress pipeline 112.

Figure 3:
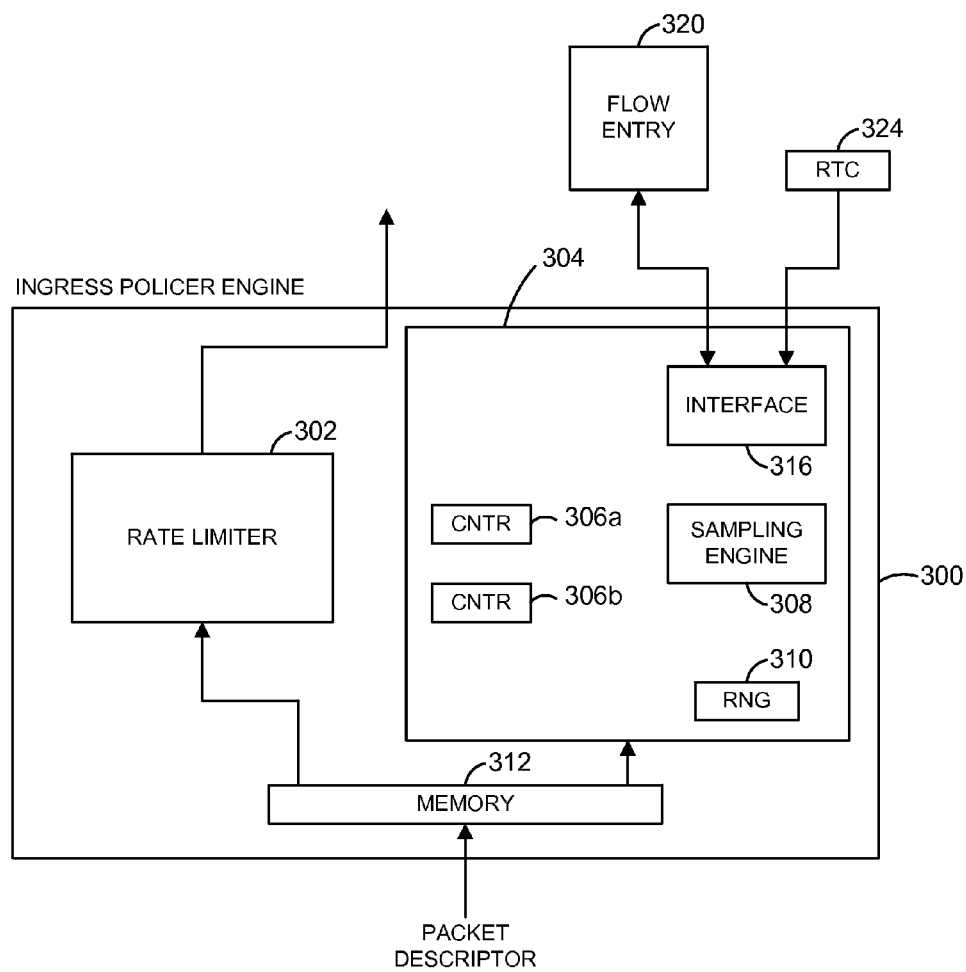
FIG. 3 is a block diagram of an example ingress policer engine.

Referring again to FIG. 1, the ingress policer engine 134, as described above, generally makes flow traffic measurements and stores flow measurement information in flow entries. FIG. 3 is a block diagram of an example ingress policer engine 300 that may be utilized in the router 100 of FIG. 1. Of course, the router 100 may utilize an ingress policer engine different than the ingress policer engine 300, and the ingress policer engine 300 may be utilized in packet forwarding device other the router 100. For example, the ingress policer engine 300 may be utilized in a router different than the router 100, a network bridge, etc. For ease of explanation, however, the ingress policer engine 300 will be described with reference to FIG. 1.

The example ingress policer engine 300 includes a rate limiter unite 302 and a measurement unit 304 that generally performs counting and sampling, makes various flow measurements, etc. A packet descriptor may be received and processed by the rate limiter unit 302, and then output from the ingress policer engine 300. The measurement unit 304 may include one or more counters 306. Although two counters 306a and 306b are illustrated in FIG. 3, the ingress policer engine 300 may include only one counter, or may include three or more counters for making flow traffic measurements.

The ingress policer engine 300 also includes a sampling engine 308. The sampling engine may sample a full packet or merely a packet header or some other subset of the packet, such as packet truncated to a fixed length. Whether a full packet or merely a packet header or some other packet subset is sampled may be configurable or non-configurable. If configurable, it may be independently configurable per-flow or merely configurable for all flows, for example. When a sampling event occurs, the sample may be mirrored to the TMM 170, or the TMM 170 merely may be alerted that a sampling event has occurred. Whether the sample is mirrored to the TMM 170 may be configurable or non-configurable. If configurable, it may be independently configurable per-flow or merely configurable for all flows, for example.

Also, the ingress policer engine 300 may include a random number generator (RNG) 310. The RNG 310 may be a pseudo-random number generator, for example. Additionally, the ingress policer engine 300 includes a memory 312 that may store a packet descriptor received by a previous unit in the ingress pipeline. If a flow ID is applied to the packet descriptor by some other unit of the ingress pipeline, such as the ingress policy engine 127, the flow ID may be output from the packet memory 312 and provided to one or more other components of the measurement unit 304.

The ingress policer engine 300 also may include an interface 316. The interface 316 may communicatively couple the ingress policer engine 300 to a flow entry 320 corresponding to the flow ID and a real-time clock (RTC) 324. If the ingress policer engine 300 is utilized in the router 100, the flow entry 320 may be stored in the memory 174 of the ASIC 172, and the RTC 324 may correspond to the RTC 178. The interface 312 may utilize the flow ID from the memory 312 to locate the flow entry 320 in the ASIC memory 174.

The ingress policer engine 300 will be described with reference to an example flow entry. For example, Table 2 lists fields of the example flow entry. It will be understood, however, that many other flow entries may also be utilized. For example, one or more fields listed in Table 2 may be omitted and other fields may be added. Also, the size and/or properties may be different than those listed in Table 2. One or ordinary skill in the art will recognize that many other variations are possible.

TABLE 2

| Size | Field | Description |
| --- | --- | --- |
| 36 | Byte_Count | Wrap-around time ≈10 minutes at 1 Gbps. |
| 30 | Packet_Count | Wrap-around time ≈10 minutes at 1 Gbps, 64 Byte packets. |
| 20 | Timestamp | Wrap-around every 256 seconds |
| 1 | Aging_flag | The TMM may set this flag to one to mark that this is an old entry. Every time a counter is updated, this flag is set to 0. |
| 2 | Sampling_mode | 0 - disable sampling<br>1 - packet<br>2 - byte<br>3 - time |
| 1 | Random_flag | 0 - deterministic<br>1 - random |
| 1 | Sampling_action | 0 - alarm<br>1 - mirror |
| 36 | Last_sampled_value | Indication of the last sampled value |
| 36 | Sampling_window | The units of the window depend on the Sampling mode. In the case of time sampling, for example, the units are clock cycles. |

TABLE 2-continued

| Size | Field | Description |
| --- | --- | --- |
| 6 | Log_sampling_range | Relevant when Random_flag = 'random'. The actual Sampling Range is $2^{Log\_sampling\_range}$. This parameter generally configures the variance of the sample point. |
| 32 | Random_offset | Every time a sampling occurs, the value of this field is set to a random number: U[0,Sampling_range]. |

The measurement unit 304 may be configured to make a variety measurements, such as one or more of an average flow rate, a moving average of the flow rate, a peak value of a flow rate, a peak value of the average flow rate, a peak value of the moving average of the flow rate, etc. The particular measurements to be taken may be independently configurable per flow, for example. For instance, the flow entry 320 may store measurement criteria that include indications of particular measurements that are to be taken for the corresponding flow, and the measurement criteria may be independently configurable per flow. The measurements taken may then be stored in the flow entry 320 by the measurement unit 304.

When a new flow is detected and the flow entry 320 is created, the TMM 170 may initialize the fields of the flow entry 320. For example, the flow entry 320 may include various count values (e.g., byte count and packet count), and the TMM 170 may initialize the count values to zero. The TMM 170 may periodically or otherwise poll or read the count values stored in flow entries to monitor flows.

Also, the flow entry 320 may include parameters that indicate how sampling is to be performed. The TMM 170 may determine how sampling is to be performed based on characteristics of the particular flow. As just one example, one type of sampling may be performed for a flow corresponding to a first TCP port whereas another type of sampling may be performed for a flow corresponding to a second TCP port. After determining the type of sampling to be performed on a flow, the TMM 170 may store the sampling configuration parameters in the flow entry 320.

The flow entry 320 includes several sampling parameter fields including Sampling_mode, Random_flag, Sampling_action, Last_sampled_value, Sampling_window, Log_sampling_range, and Random_offset. The Sampling_mode field indicates whether sampling is to be performed on the flow and, if so, the type of sampling to be performed (e.g., packet sampling, byte sampling, or time sampling). The Random_flag field indicates whether sampling technique should be random or deterministic. The Sampling_action field indicates whether a sample should be mirrored to the TMM 170 or if the TMM 170 should be notified when a sample has been acquired.

The Last_sampled_value is an indication of the last value that was sampled. The Last_sampled_value may be used to determine when the next sample should be acquired. The Sampling_window field generally indicates the sampling period, and may be added to the Last_sampled_value to determine when the next sample should be acquired. If random sampling is utilized, the Sampling_window field specifies a minimum sampling period—a random offset is added to the Sampling_window each sampling period to determine the spacing between a current sample and a next sample. Thus, the Sampling_window field generally specifies an upper bound on the sampling frequency when random sampling is utilized. If deterministic sampling is utilized, the Sampling_window field generally specifies the sampling period.

The Log_sampling_range field and the Random_offset field are relevant for random sampling. For example, the Log_sampling_range field specifies a range in which the random offset discussed above may vary. The Random_offset field specifies the random offset discussed above. For example, the Random_offset may be a random value having a uniform distribution between zero and $2^{Log\_sampling\_range}$. Of course, the distribution need not be uniform, but could have another distribution such as a Gaussian distribution.

Operation of the example ingress policer engine 300 will now be further described with reference to FIG. 4, which is a flow diagram of an example method 350 that may be implemented by the ingress policer engine 300 when a packet is received by the ingress policer engine 300. Although the example method 350 may be implemented by the ingress policer engine 300 of FIG. 3, it will be understood that the example method 350 may be implemented by an ingress pipeline unit different than the example ingress policer engine 300, and that the ingress policer engine 300 need not implement the method 350.

At block 354, the ingress policer engine 300 may access a flow entry 320 corresponding to a received packet. For example, a flow ID obtained from the packet memory 312 may be provided to the interface 316. The interface 316 may then utilize the flow ID to locate and access the flow entry 320. At block 358, the ingress policer engine 300 may retrieve counter values from the flow entry 320. For example, the interface 316 may retrieve the counter values from the flow entry 320. As another example, the one or more counters 304 may retrieve the counter values from the flow entry 320.

At block 362, the counter values may be updated based on the packet stored in the packet memory 312. For example, the counter 304a may correspond to a byte counter, whereas the counter 304b may correspond to a packet counter. The counter 304a may be initialized with a previous byte count value retrieved from the flow entry 320 at the block 358, and then count the number of packets in the packet stored in the packet memory 312. If a flow entry including the elements listed in Table 2 is employed, the Byte_count value may be retrieved and used to initiate the counter 304a. Also, the Byte_count value may be updated in the flow entry 320 after all of the bytes of a packet have been counted. Generally, based on the example field size of 36 bits and a 1 gigabit per second (Gbps) wire speed, the Byte_count value may wrap around in approximately 10 minutes. In some embodiments, the counter 304a may generate a signal indicating that the Byte_count value is approaching wrap around. For example, if the Byte_count value exceeds a threshold (which may be configurable), the signal indicating that the counter is approaching wrap around (e.g., an interrupt to the TMM 170) may be generated. In response to such a signal, the TMM 170 can perform a counter dump on the Byte_count field. In some embodiments, the counter 304a additionally or alternatively may generate a signal indicating when the Byte_count value has wrapped around (e.g., an interrupt to the TMM 170 and/or a signal to the sampling engine 308). This signal may indicate to the sampling engine 308 and/or the TMM 170 an error associated with the Byte_count.

Also, the counter 304b may increment a previous packet count value retrieved from the flow entry 320 at the block 358. If a flow entry including the elements listed in Table 2 is employed, the Packet_count value may be retrieved and updated. Generally, based on the example field size of 30 bits and a 1 gigabit per second (Gbps) wire speed with 64 byte packets, the Packet_count value may wrap around in approximately 10 minutes. In some embodiments, the counter 304b may generate a signal indicating that the Packet_count value is approaching wrap around. In response to such a signal, the ingress policer engine 300 may notify the TMM 170 so that the TMM 170 can perform a counter dump on the Packet_count field. In some embodiments, the counter 304b additionally or alternatively may generate a signal indicating when the Packet_count value has wrapped around (e.g., an interrupt to the TMM 170 and/or a signal to the sampling engine 308). This signal may indicate to the sampling engine 308 and/or the TMM 170 an error associated with the Packet_count.

At block 366, the counter values updated at the block 366 may be stored to the flow entry 320. For example, the interface 316 may store the updated counter values to the flow entry 320. As another example, the one or more counters 304 may store the updated counter values to the flow entry 320. The interface 316 also may apply a time stamp to the flow entry 320 to indicate when the counters were updated. For example, the interface 316 may be communicatively coupled to the RTC 324, and the interface 316 may obtain a time stamp value from the RTC 324 at a time proximate to the time the counter values are stored to the flow entry 320. Then, the interface 316 may store the time stamp value to the flow entry. If a flow entry including the elements listed in Table 2 is employed, the interface 316 may store the time stamp value in the Timestamp field.

At block 370, the ingress policer engine 300 may retrieve sampling parameters from the flow entry 320. For example, the interface 316 may retrieve the sampling parameters from the flow entry 320. As another example, the sampling engine 308 may retrieve the sampling parameters from the flow entry 320. If a flow entry including the elements listed in Table 2 is employed, the parameters Sampling_mode, Random_flag, Sampling_action, Last_sampled_value, Sampling_window, Log_sampling_range and Random_offset may be retrieved.

At block 374, the sampling engine 308 is configured with at least some of the parameters retrieved at block 370. For example, the sampling engine 308 may be configured to disable sampling, to perform packet sampling, to perform byte sampling, or to perform time sampling. As another example, the sampling engine 308 may be provided with an indication of when the last sample was taken, which may be used by the sampling engine 308 to determine when the next sample should be taken. Further, the sampling engine 308 may be provided with an indication of the sampling period or frequency. Still further, the sampling engine 308 may be provided with an indication of whether sampling should be deterministic or random. Also, the sampling engine 308 may be provided with an indication of whether the entire packet is to be sampled or if merely a subset of the packet is to be sampled, such as a truncation of the packet to a fixed length, the header, etc. If a subset is to be sampled, the particular subset may be configurable (e.g., truncation of packet or packet header).

At block 378, the sampling engine 308 determines if a sample should be taken and, if necessary, takes one or more samples. At block 382, if one or more samples have been taken, the one or more samples may be provided to the TMM 170. Providing a sample to the TMM 170 may include sending the sample to the TMM 170 or storing the sample in a memory associated with the ingress policer engine 300 and then notifying the TMM 170 that a sample has been taken.

At block 386, sampling parameters in the flow entry may be updated, if necessary. For example, if the parameters in Table 2 are utilized, the Last_sampled_value may be updated when a sample has been taken. Also, if random sampling is utilized, the Random_offset value may be updated after a sample has been taken. For example, the RNG 310 may utilize the Log_sampling_range parameter to generate a random number in the range of 0 to $2^{Log\_sampling\_range}$.

Figure 4:
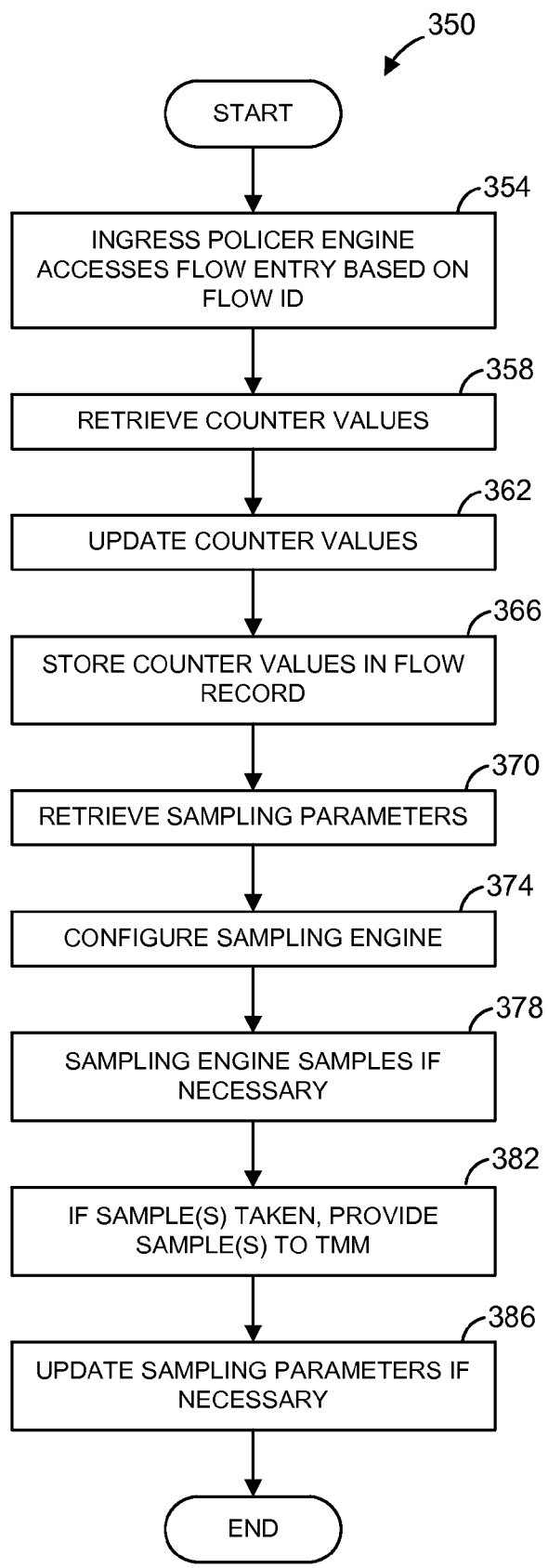
FIG. 4 is a flow diagram of an example method that may be implemented by the policer engine of FIG. 3.

The ingress policer engine 300 of FIG. 3 and the method 350 of FIG. 4 each permit sampling criteria to be independently configurable per-flow. In other words, each flow may utilize a particular sampling scheme and period/frequency independent of other flows. For example, different flows may utilize different sampling frequencies/periods. As another example, some flows may utilize byte sampling, other flows may utilize packet sampling, and still other flows may utilize time sampling. As still another example, some flows may utilize random sampling whereas other flows utilize deterministic sampling. Additionally, whether random sampling is utilized may be configurable independent of whether byte, packet, or time sampling is utilized. Additionally, in the ingress policer engine 300 of FIG. 3 and the method 350 of FIG. 4, the sampling mechanism and the counting mechanism may be independent. For example, all packets may be counted by the policer engine 300, including both sampled and non-sampled packets.

Figure 5:
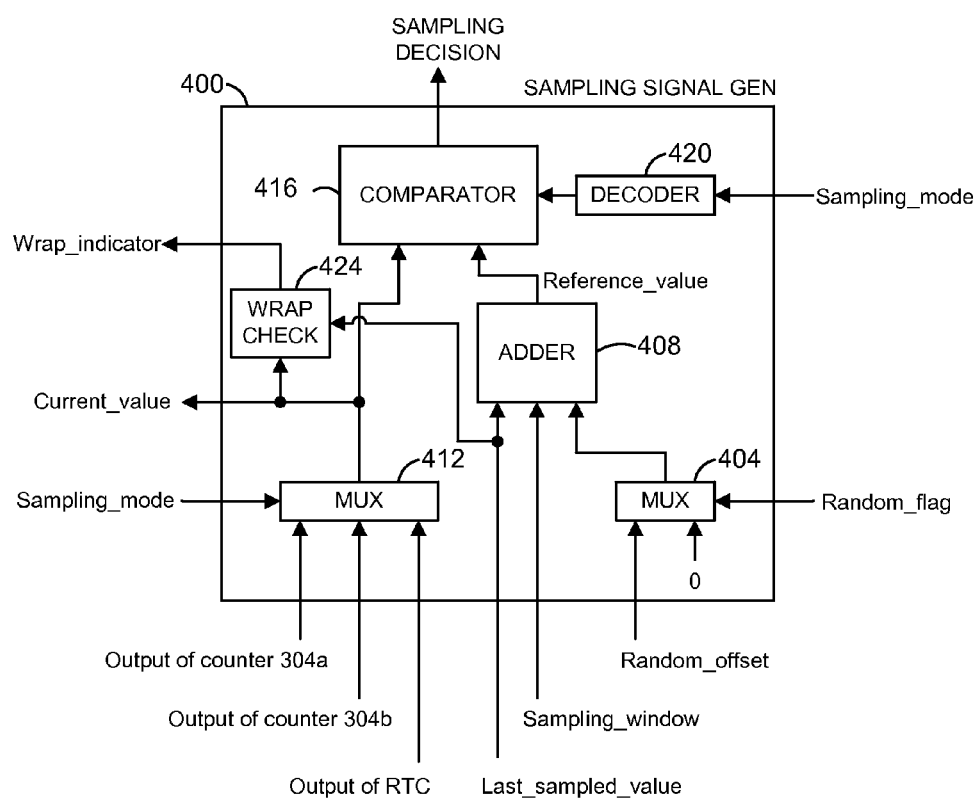
FIG. 5 is a block diagram of an example sampling signal generator that may be utilized in the policer engine of FIG. 3.

FIG. 5 is a block diagram of an example sampling signal generator 400 that may be included in the sampling engine 308. The sampling signal generally indicates when a sample should be taken. If the sampling signal indicates that a sample should be taken, the packet stored in the packet memory 312 may be mirrored to the TMM 170, or the packet stored in the packet memory 312 may be stored in a sampling memory and the TMM 170 may be notified by a signal such as an interrupt that a sample has been taken. Alternatively, if the sampling signal indicates that a sample should be taken, the next packet received by the ingress policer engine 300 may be mirrored to the TMM 170, or the next received packet may be stored in a sampling memory and the TMM 170 may be notified by a signal such as an interrupt that a sample has been taken.

The sampling signal generator 400 may be utilized if the parameters in Table 2 are utilized. It will be understood that the sampling engine 308 may utilize a different sampling signal generator than the sampling signal generator 400.

The sampling signal generator 400 includes a multiplexer 404 that generally selects between the Random_offset value and zero based on the Random_flag value. For instance, when the Random_flag indicates that random sampling is to be implemented, the multiplexer 404 selects the Random_offset value. On the other hand, when the Random_flag indicates that deterministic sampling is to be implemented, the multiplexer 404 selects the value zero.

An output of the multiplexer 404 is coupled to an input of an adder 408. Two other inputs of the adder 408 receive the Last_sampled_value and the Sampling_window value. The adder 408 generally generates a Reference_value based on adding the Last_sampled_value and the Random_offset. If the Random_flag indicates that random sampling is to be implemented, the adder 408 also adds the Random_offset value.

The sampling signal generator 400 also includes a multiplexer 412 that generally selects between an output of the counter 304a, and output of the counter 304b, and an output of the RTC 324 based on the Sampling_mode value. For example, if the Sampling_mode value indicates that byte sampling is to be implemented, the multiplexer 412 may select the output of the counter 304a. If the Sampling_mode value indicates that packet sampling is to be implemented, the multiplexer 412 may select the output of the counter 304b. If the Sampling_mode value indicates that time sampling is to be implemented, the multiplexer 412 may select the output of the RTC 324. An output of the multiplexer 412 may be referred to as a Current_value.

A comparator 416 is coupled to the multiplexer 404 and the multiplexer 412. The comparator 416 generally compares the Current_value to the Reference_value and generates the sampling signal based on the comparison. For instance, if the Current_value is greater than or equal to the Reference_value, the sampling signal may be generated to indicate that a sample should be taken. The sampling signal may also indicate when that the Last_sampled_value should be updated as the Current_value.

A decoder 420 generates an enable signal to enable and disable the comparator 416. For example, if the Sampling_mode value indicates that sampling is disabled, the decoder 420 may generate a signal that disables the comparator 416 from generating the sampling signal indicating that a sample should be taken.

A wrap-around detector 424 may generate a signal that indicates that a counter wrap-around has occurred. For example, the wrap-around detector 424 may compare the Current_value with the Last_sampled_value. If the Current_value is less than the Last_sampled_value, the wrap-around detector 424 may generate a signal that indicates that a counter wrap-around has occurred. The wrap-around indicator signal may be used to reset the Last_sampled_value to the Current_value. In other words, if Current_value is less than the Last_sampled_value, then set the Last_sampled_value to the Current_value. Additionally or alternatively, the wrap-around indicator signal may be an interrupt to the TMM 170.

In some embodiments, the counter 304a and/or the counter 304b may provide a wrap around signal to indicate when the counter 304a and/or the counter 304b has wrapped around. This signal may be utilized by the comparator 416 and/or the decoder 420 to disable the comparison when a signal has wrapped around.

Figure 6:
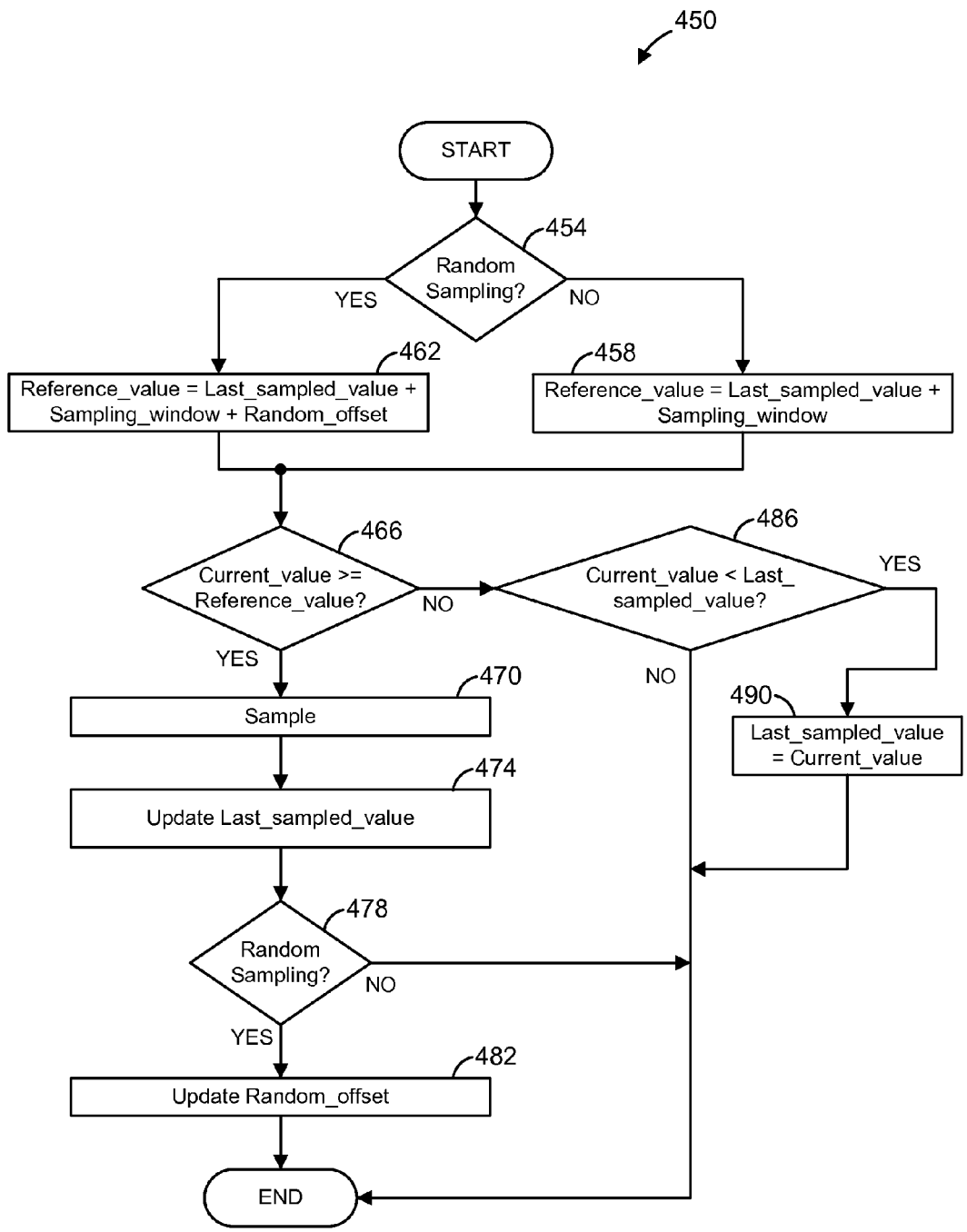
FIG. 6 is a flow diagram of an example method for determining when a sample should be taken.

FIG. 6 is a flow diagram of an example method 450 for determining when a sample should be taken. The method 450 is explained with reference to parameters listed in Table 2. The method 450 may be implemented by the ingress policer engine 300 of FIG. 3, for example. Also, the method 450 may be implemented using the sampling signal generator 400 of FIG. 5. It will be understood, however, that the method 450 may be implemented by an ingress pipeline unit different than the ingress policer engine 300. Similarly, it will be understood that the method 450 may be implemented using a sampling signal generator different than the sampling signal generator 400. For ease of explanation, however, the method 450 will be described with reference to FIGS. 3 and 5. The method 450 may be implemented periodically or in response to an event such as a counter update, for example.

At block 454, it is determined whether random sampling is to be implemented. For example, the Random_flag from the flow entry 320 may be examined to determine whether random sampling is to be implemented. If random sampling is not to be implemented, the flow of the method 450 may proceed to block 458. At block 458, the Reference_value variable may be determined by adding the Last_sampled_value and the Sampling_window parameters from the flow entry 320. On the other hand, if it is determined at block 454 that random sampling is to be implemented, the flow of the method 450 may proceed to block 462. At block 462, the Reference_value variable may be determined by adding the Last_sampled_value, the Sampling_window and the Random_offset parameters from the flow entry 320. Referring to FIG. 5, the blocks 454, 458 and 462 may be implemented by the multiplexer 404 and the adder 408.

At block 466, it may be determined if a Current_value is greater than or equal to the Reference_value. The Current_value may be a byte count from the counter 304a, a packet count from the counter 304b or a time from the RTC 324 depending on the type of sampling to be performed (e.g., byte sampling, packet sampling or time sampling). Referring to FIG. 5, the block 466 may be implemented by the multiplexer 412 and the comparator 416.

If it is determined at block 466 that the Current_value is greater than or equal to the Reference_value, the flow of the method 450 may proceed to block 470, at which a sample is taken. Depending on the type of sampling to be performed, the sample may be a byte sample or a packet sample, for example. Referring to FIG. 5, the block 470 may be implemented using the comparator 416. For instance, the sampling signal generated by the comparator 416 may enable or cause the sampling engine 308 to take a sample.

At block 474, the Last_sample_value in the flow entry 320 may be updated. In particular, the Last_sample_value may be set to the Current_value. The block 474 may be implemented by the interface 316 and the multiplexer 412. For instance the multiplexer 412 may select the Current_value and the interface 316 may store the Current_value in the flow entry 320.

At block 478, it may be determined if random sampling was implemented. For example, the Random_flag from the flow entry 320 may be examined to determine whether random sampling is to be implemented. The blocks 454 and 478 optionally may be combined rather than separately checking whether random sampling is implemented at two different blocks. If random sampling is not to be implemented, the flow of the method 450 may end. If it is determined at block 478 that random sampling is to be implemented, the flow of the method 450 may proceed to block 482. At block 482, the Random_offset parameter of the flow entry 320 may be updated. For example, the interface 316 may include logic that examines the Random_flag field to determine whether random sampling is implemented and to cause the RNG 310 to generate a random number in the range of 0 to $2^{Log\_sampling\_range}$ (uniform distribution or some other suitable distribution). Additionally, the interface 316 may store an output of the RNG 310 in the Random_offset field.

If at block 466, it is determined that the Current_value is less than the Reference_value, the flow of the method 450 may proceed to block 486, at which it may be determined whether the Current_value is less than the Last_sampled_value. If the Current_value is not less than the Last_sampled_value, the flow of the method 450 may end. On the other hand, if it is determined at block 486 that the Current_value is less than the Last_sampled_value, this indicates a wrap-around condition occurred, and the flow may proceed to block 490. At block 490, the Last_sampled_value is set to the Current_value. Then, the flow of the method 450 ends.

As can be seen in FIGS. 5 and 6, one sampling algorithm or one sampling apparatus can be utilized to implement byte, packet or time sampling, each either performed deterministically or randomly. For example, in the sampling signal generator 400 of FIG. 5, the multiplexer 412 may be controlled to determine whether byte-, packet-, or time-based sampling is utilized. Also, the multiplexer 404 may be controlled to determine whether deterministic or random sampling is utilized, and the multiplexer 404 can be controlled independent of the multiplexer 412. Moreover, with random sampling, an upper bound on the sampling rate is guaranteed by the example apparatus of FIG. 5 and the example method of FIG. 6.

Figure 7:
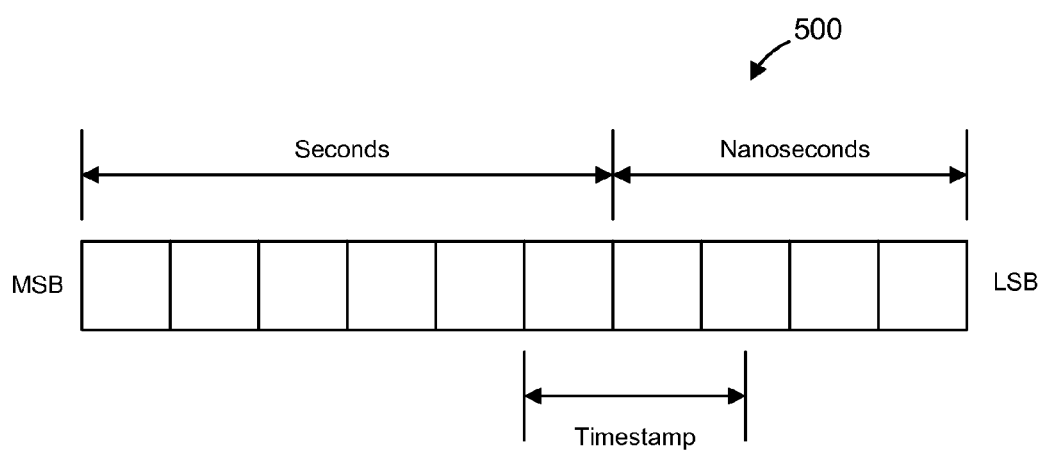
FIG. 7 is a block diagram of an example real time clock time register that may be utilized in the router of FIG. 1.

FIG. 7 is block diagram of an example RTC time register 500 that may be utilized in the RTC 178 and/or the RTC 324. It is noted that the RTC 178 and/or the RTC 324 may utilize a register different than the register 500.

The register 500 includes a 4-byte nanoseconds counter and a 6-byte seconds counter. The least significant byte of the seconds counter and the 12 most significant bits of the nanoseconds counter may be utilized as a time stamp.

Although FIGS. 3-6 were described with reference to an ingress pipeline and/or the ingress policer engine 134 of FIG. 1, similar apparatus and/or methods may also be utilized in an egress pipeline. For example, similar apparatus and/or methods may be utilized with the egress policer engine 156 of FIG. 1.

At least portions of the flow classification and flow measurement techniques described herein may be implemented in software stored in, for example, a memory and implemented on a processor associated with the memory. For example, the TMM 170 of FIG. 1 may be implemented, at least partially, by software instructions implemented by a processor. If implemented in software, the routines may be stored in any computer readable memory such as in RAM, ROM, flash memory, a magnetic disk, a laser disk, or other storage medium. Likewise, this software may be delivered to a router or network bridge device via any known or desired delivery method including, for example, over a communication channel such as a telephone line, a T1 line, a cable television line, the Internet, a wireless connection, etc., or via a transportable medium, such as a computer-readable disk, flash drive, etc.

Other portions of the flow classification and flow measurement techniques described herein may be implemented in hardware or firmware. When implemented in hardware, the blocks, operations, techniques, etc., may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a wireless communication channel, a wired telephone line, a DSL line, a cable television line, the Internet, etc. (which are viewed as being the same as or interchangeable with providing such software via a transportable storage medium).

The present invention may be embodied in any type of router or network bridge device used in a wired or wireless communication system including, for example, ones used in communication systems including or coupled to a wired or wireless local area network or a wired or wireless wide area network, Internet, cable and satellite based communication systems (such as Internet, data, video and voice communication systems), wireless telephone systems (including cellular phone systems, voice over internet protocol (VoIP) systems, home-based wireless telephone systems, etc.)

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for analyzing packets received from a network, comprising:
    receiving packets from a network at a packet processing pipeline;
    classifying, using the packet processing pipeline, the received packets based on information in the received packets: (1) as belonging to one of a plurality of identified flows, or (2) as not belonging to any of the plurality of identified flows;
    for each received packet determined not to belong to one of the previously identified flows:
        sending at least a portion of the packet or a corresponding packet descriptor to a processing unit separate from the packet forwarding pipeline, wherein the processing unit operates at a speed slower than an operating speed of the packet processing pipeline,
        analyzing the at least the portion of the packet or the corresponding packet descriptor using the processing unit,
        defining a new flow corresponding to the packet using the processing unit and based on the analysis of the at least the portion of the packet or the corresponding packet descriptor,
        configuring, using the processing unit, the packet processing pipeline so that the packet processing pipeline recognizes the new flow as a one of the plurality of identified flows, and
        configuring, using the processing unit, the packet processing pipeline with one or more new rules corresponding to the new flow so that packets belonging to the new flow are processed by the packet processing pipeline according to the one or more new rules.

2. A method according to claim 1, wherein the processing unit is a processor that executes machine readable instructions; and
    wherein sending at least a portion of the packet or the corresponding packet descriptor to the processing unit separate from the packet forwarding pipeline comprises sending at least the portion of the packet or the corresponding packet descriptor to the processor.

3. A method according to claim 1, further comprising:
    for each received packet classified as belonging to one of the plurality of identified flows, assigning, using the packet processing pipeline, a flow identifier to a packet descriptor corresponding to the packet to indicate a flow to which the packet belongs and directing the corresponding packet descriptor to a next location in the packet forwarding pipeline so that the packet descriptor is processed by the packet processing pipeline according to one or more rules corresponding to the flow identifier.

4. A method according to claim 1, wherein configuring the packet processing pipeline with one or more new rules corresponding to the new flow comprises:
    storing in a memory a sampling frequency indicator, the sampling frequency indicator corresponding to a first sampling frequency according to which the packet processing pipeline is to sample packets that belong to the new flow.

5. A method according to claim 1, wherein configuring the packet processing pipeline with one or more new rules corresponding to the new flow comprises:
storing in a memory a sampling mode indicator that indicates a type of sampling to be utilized by the packet processing pipeline when sampling packets that belong to the new flow.

6. A method according to claim 5, wherein the sampling mode indicator indicates a selection from a set of sampling modes including packet sampling, byte sampling, and time sampling.

7. A method according to claim 1, wherein configuring the packet processing pipeline with one or more new rules corresponding to the new flow comprises:
storing in a memory a random sampling indicator that indicates whether the packet processing pipeline should utilize random sampling or deterministic sampling when sampling packets that belong to the new flow.

8. A method according to claim 1, further comprising:
storing in a memory a first sampling frequency indicator, the first sampling frequency indicator corresponding to a first sampling frequency for sampling packets that belong to a first flow in the plurality of identified flows;
storing in the memory a second sampling frequency indicator, the second sampling frequency indicator corresponding to a second sampling frequency for sampling packets that belong to a second flow in the plurality of identified flows;
sampling, using the packet processing pipeline, packets classified as belonging to the first flow according to the first sampling frequency determined based on retrieving the first sampling frequency indicator from the memory; and
sampling, using the packet processing pipeline, packets classified as belonging to the second flow according to the second sampling frequency determined based on retrieving the second sampling frequency indicator from the memory.

9. A method according to claim 1, further comprising:
storing in a memory a first sampling mode indicator corresponding to a first flow in the plurality of identified flows;
storing in the memory a second sampling mode indicator corresponding to a second flow in the plurality of identified flows;
determining a first mode of sampling to utilize with packets from the first flow based on retrieving the first sampling mode indicator from the memory;
determining a second mode of sampling to utilize with packets from the second flow based on retrieving the second sampling mode indicator from the memory;
sampling, using the packet processing pipeline, packets classified as belonging to the first flow according to the first mode of sampling; and
sampling, using the packet processing pipeline, packets classified as belonging to the second flow according to the second mode of sampling.

10. A method according to claim 9, wherein:
determining the first mode of sampling to perform comprises selecting, according to the first sampling type indicator, the first mode of sampling from a set of sampling modes including packet sampling, byte sampling, and time sampling;
determining the second mode of sampling to perform comprises selecting, according to the second sampling mode indicator, the second mode of sampling from the set of sampling modes including packet sampling, byte sampling, and time sampling.

11. An apparatus, comprising:
a processing unit;
a packet processing pipeline separate from and coupled to the processing unit, wherein the packet processing pipeline operates at a speed faster than an operating speed of the processing unit, and wherein the packet processing pipeline is configured to:
classify packets received via a network based on information in the received packets: (1) as belonging to one of a plurality of identified flows, or (2) as not belonging to any of the plurality of identified flows, and
for each received packet determined not to belong to one of the previously identified flows, send at least a portion of the packet or a corresponding packet descriptor to the processing unit;
wherein the processing unit is configured to, for each received packet determined not to belong to one of the previously identified flows:
analyze the at least the portion of the packet or the corresponding packet descriptor,
define a new flow corresponding to the packet based on the analysis of the at least the portion of the packet or the corresponding packet descriptor,
configure the packet processing pipeline so that the packet processing pipeline recognizes the new flow as a one of the plurality of identified flows, and
configure the packet processing pipeline with one or more new rules corresponding to the new flow so that packets belonging to the new flow are processed by the packet processing pipeline according to the one or more new rules.

12. An apparatus according to claim 11, wherein the processing unit is a processor that executes machine readable instructions.

13. An apparatus according to claim 11, wherein the packet processing pipeline is configured to:
for each received packet classified as belonging to one of the plurality of identified flows, assign a flow identifier to a packet descriptor corresponding to the packet to indicate a flow to which the packet belongs and direct the corresponding packet descriptor to a next location in the packet processing pipeline so that the packet descriptor is processed by the packet processing pipeline according to one or more rules corresponding to the flow identifier.

14. An apparatus according to claim 11, wherein the packet processing pipeline includes a ternary content addressable memory (TCAM) associated with classifying packets as belonging to one of the plurality of identified flows;
wherein the processing unit is configured to cause an entry to be stored in the TCAM so that, when at least a portion of a header of a packet from the new flow is applied to the TCAM as a key, the packet processing pipeline recognizes the packet as belonging to one of the plurality of identified flows.

15. An apparatus according to claim 11, wherein:
the packet processing pipeline includes a memory;
the processing unit is configured to store in the memory a sampling frequency indicator associated with the new flow, the sampling frequency indicator corresponding to a first sampling frequency according to which the packet processing pipeline is to sample packets that belong to the new flow.

16. An apparatus according to claim 11, wherein:
the packet processing pipeline includes a memory;
the processing unit is configured to store in the memory a sampling mode indicator associated with the new flow that indicates a type of sampling to be utilized by the packet processing pipeline when sampling packets that belong to the new flow.

17. An apparatus according to claim 16, wherein the packet processing pipeline is configured to select a sampling mode for performing sampling of packets that belong to the new flow by selecting, using the sampling mode indicator, from a set of sampling modes including packet sampling, byte sampling, and time sampling.

18. An apparatus according to claim 11, wherein:
the packet processing pipeline includes a memory;
the processing unit is configured to store in the memory a random sampling indicator that indicates whether the packet processing pipeline should utilize random sampling or deterministic sampling when sampling packets that belong to the new flow.

19. An apparatus according to claim 11, wherein the packet processing pipeline includes a memory;
wherein the processing unit is configured to:
cause a first sampling frequency indicator to be stored in the memory, the first sampling frequency indicator corresponding to a first sampling frequency for sampling packets that belong to a first flow in the plurality of identified flows,
cause a second sampling frequency indicator to be stored in the memory, the second sampling frequency indicator corresponding to a second sampling frequency for sampling packets that belong to a second flow in the plurality of identified flows;
wherein the packet processing pipeline is configured to:
sample packets classified as belonging to the first flow according to the first sampling frequency determined based on retrieving the first sampling frequency indicator from the memory, and
sample packets classified as belonging to the second flow according to the second sampling frequency determined based on retrieving the second sampling frequency indicator from the memory.

20. An apparatus according to claim 11, wherein the packet processing pipeline includes a memory;
wherein the processing unit is configured to:
cause a first sampling mode indicator corresponding to a first flow in the plurality of identified flows to be stored in the memory,
cause a second sampling mode indicator corresponding to a second flow in the plurality of identified flows to be stored in the memory;
wherein the packet processing pipeline is configured to:
determine a first mode of sampling to utilize with packets from the first flow based on retrieving the first sampling mode indicator from the memory,
determine a second mode of sampling to utilize with packets from the second flow based on retrieving the second sampling mode indicator from the memory,
sample, using the packet processing pipeline, packets classified as belonging to the first flow according to the first mode of sampling, and
sample, using the packet processing pipeline, packets classified as belonging to the second flow according to the second mode of sampling.

21. An apparatus according to claim 20, wherein the packet processing pipeline is configured to:
select, according to the first sampling type indicator, the first mode of sampling from a set of sampling modes including packet sampling, byte sampling, and time sampling;
select, according to the second sampling mode indicator, the second mode of sampling from the set of sampling modes including packet sampling, byte sampling, and time sampling.

* * * * *